United States Patent
Matsushima et al.

(10) Patent No.: US 7,436,663 B2
(45) Date of Patent: Oct. 14, 2008

(54) DISK ARRAY SYSTEM

(75) Inventors: Hitoshi Matsushima, Ryugasaki (JP); Hiroshi Fukuda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 11/698,851

(22) Filed: Jan. 29, 2007

(65) Prior Publication Data

US 2008/0007912 A1  Jan. 10, 2008

(30) Foreign Application Priority Data

Jul. 7, 2006  (JP) .............................. 2006-187342

(51) Int. Cl.
*H05K 7/20* (2006.01)
(52) U.S. Cl. .................. 361/695; 361/685; 361/700; 361/715; 361/716; 174/16.1; 165/104.33
(58) Field of Classification Search ................ None
See application file for complete search history.

(56) References Cited

U.S. PATENT DOCUMENTS

| | | | | |
|---|---|---|---|---|
| 6,525,935 B2 * | 2/2003 | Casebolt | ...................... | 361/687 |
| 6,563,706 B1 * | 5/2003 | Strickler | ...................... | 361/695 |
| 6,816,368 B2 * | 11/2004 | Yokosawa | ..................... | 361/685 |
| 6,819,560 B2 * | 11/2004 | Konshak et al. | .............. | 361/687 |
| 6,826,456 B1 * | 11/2004 | Irving et al. | ................. | 700/299 |
| 7,002,799 B2 * | 2/2006 | Malone et al. | ............... | 361/699 |
| 7,046,470 B2 * | 5/2006 | Yamanashi et al. | ............ | 360/69 |
| 7,046,513 B2 * | 5/2006 | Nishiyama et al. | ........... | 361/695 |
| 7,139,170 B2 * | 11/2006 | Chikusa et al. | .............. | 361/695 |
| 7,352,571 B2 * | 4/2008 | Suzuki et al. | ................ | 361/687 |
| 7,362,572 B1 * | 4/2008 | Wierzbicki et al. | ......... | 361/695 |
| 2007/0053154 A1 * | 3/2007 | Fukuda et al. | ............... | 361/687 |

FOREIGN PATENT DOCUMENTS

| | | |
|---|---|---|
| JP | 05-054626 A | 3/1993 |
| JP | 05-175679 A | 7/1993 |
| JP | 09-274791 A | 10/1997 |
| JP | 2001-338486 A | 12/2001 |
| JP | 2001-344961 A | 12/2001 |

* cited by examiner

*Primary Examiner*—Boris L Chervinsky
(74) *Attorney, Agent, or Firm*—Crowell & Moring LLP

(57) ABSTRACT

In a disk array apparatus according to an aspect of the invention, temperatures of disk drives arranged in a casing are equalized to reduce a noise. A disk array apparatus 50 comprises plural disk drives 2, fans 5, and a casing 1. The disk drives 2 are arranged in an array, the fans 5 are provided on one end side of rows of the disk drives, and the casing 1 accommodates the disk drives 2 and the fans 5. Air which has already cooled the disk drives flows through an air duct 10. A sub-fan 6 exhausts the air flowing through the air duct to the outside of the casing 1. A nozzle 11 is arranged in a front end portion of the air duct. One end portion of the nozzle 11 is arranged between the disk drives.

10 Claims, 6 Drawing Sheets

DISK ARRAY SYSTEM

BACKGROUND OF THE INVENTION

1. Field of the Invention

The present invention relates to a disk array apparatus, particularly to a magnetic or optical type disk array apparatus.

2. Background of the Invention

The disk array apparatus in which many magnetic or optical type disk drives are incorporated into a casing is connected to a dedicated high-speed network line such as an optical network line, and is managed by management software. The disk array apparatus is used as SAN (Storage Area Network), NAS (Network Attached Storage), or a single RAID (Redundant Array of Inexpensive Disks) disk apparatus.

Japanese Patent Application Laid-Open No. 9-274791 discloses an example of such kind of disk array apparatus. In the disk array apparatus disclosed in Japanese Patent Application Laid-Open No. 9-274791, a board is used on which a disk drive and a control circuit are mounted on the same plane and an air guide plate is provided on this board so that cooling flow passages for the disk drive and control circuit are separated. Japanese Patent Application Laid-Open No. 2001-338486 also discloses a disk array apparatus in which a flow passage including the disk drive and a flow passage including the control board are separated to evenly cool each of the passages.

Japanese Patent Application Laid-Open No. 5-54626 discloses a disk drive apparatus in which the disk drives are arranged in a staggered array. Japanese Patent Application Laid-Open No. 2001-344961 discloses a magnetic type disk drive in which a cooling control plate is provided to increase a wind velocity of a cooling air passing through the printed circuit board side. Japanese Patent Application Laid-Open No. 5-175679 discloses a technique in which an impingement jet duct is provided in an electronic device so that air impinges directly on a heating body by the impingement jet air duct.

In the disk drive apparatus disclosed in Japanese Patent Application Laid-Open No. 9-274791, the number of mountable disk drives is restricted because the disk drive and the controller are mounted on the same board. There is no sufficient consideration for equalization of a temperature distribution among the disk drives mounted on the board. In the disk drive apparatus disclosed in Japanese Patent Application Laid-Open No. 2001-338486, it is described that the whole of the disk drive apparatus is cooled to the same level as other components. However, because the disk drive and the controller are placed on the same board, there is no consideration for the equalization of the temperature distribution among the disk drives in the cooling air flow direction, when the plural disk drives are mounted.

In the disk drive apparatus disclosed in Japanese Patent Application Laid-Open No. 5-54626, although flow resistance is increased, mixing of cooling air flowing along side faces of the disk drives is enhanced, which allows improvement of cooling capacity for the disk drive. However, a large space is formed above the disk drive in the case where the many disk drives are arranged in the cooling passage, the cooling air may flow through the space above the disk drive without passing through the disk drive arranged near the board surface in a staggered array in which the flow resistance is large.

In the disk drive apparatus disclosed in Japanese Patent Application Laid-Open No. 2001-344961, the cooling capacity can be improved for the single disk drive. However, the disk drive apparatus disclosed in Japanese Patent Application Laid-Open No. 2001-344961 has a single disk drive, and there is no consideration for the case that the many disk drives are arrayed. In the electronic apparatus disclosed in Japanese Patent Application Laid-Open No. 5-175679, because air impinges directly on each of heating bodies, the temperature distribution can be equalized among the disk drives. However, in order to obtain the good cooling capacity, it is necessary that the impingement jet air duct and a fan provided in the jet air duct should be provided at the most upstream side of the cooling air in the casing. In the electronic device, it is possible that the air duct and the fan can be provided at this position. On the contrary, in the disk array apparatus, it is difficult to take such a layout because the disk drives are arranged on the most upstream side of the cooling air. Additionally, in order to evenly blow the cooling air to each of the disk drives, the flow resistance is extremely increased in an opening provided in the impingement jet air duct, which results in the upsizing of the fan provided in the impingement jet air duct.

SUMMARY OF THE INVENTION

In view of the foregoing, an object of the invention is to equalize temperatures of disk drives arranged in the casing in the disk array apparatus. Another object of the invention is to reduce a noise of the disk array apparatus. Still another object of the invention is to improve reliability of the disk drive to lengthen a life. Still another object of the invention is to mount the disk drives at high density to allow large capacity and high speed of the disk array apparatus. The invention is directed to achieve at least one of these objects.

A disk array apparatus according to an aspect of the invention includes a disk drive array in which plural disk drives are arranged in an array; a casing which accommodates the disk drive array; a fan which is arranged on one end side of the disk drive array; a cooling means which is arranged in an intermediate portion of the disk drive array, wherein the cooling means is arranged to cool a part of the disk drives which is positioned on a downstream side of the cooling air which is generated by the fan, with respect to cooling means.

In the disk array apparatus according to the aspect of the invention, preferably the cooling means is a suction tube arranged in the intermediate portion of the disk drive array, and an air duct, through which the cooling air which has already cooled the disk drive array flows, is connected to the suction tube. An exhaust means is provided, for exhausting the cooling air flowing through the air duct to the outside of the casing. In the disk array apparatus according to the aspect of the invention, preferably the exhaust means has an intake fan and a chamber which accommodates the intake fan, the other end of the air duct being connected to the chamber, and the chamber is provided in the casing.

In the disk array apparatus according to the aspect of the invention, preferably, in the casing, the disk drive arrays are arranged in one row in a vertical direction and in plural rows in a horizontal direction, and the fans are arranged every row or every plural rows of the disk drives. In the disk array apparatus according to the aspect of the invention, preferably additional cooling means is provided in the cooling means through a heat transfer tube, the additional cooling means being arranged near an opening formed in the casing, the additional cooling means locally cooling hot air caused by heat generation of the disk drive array and exhausting the air to the outside of the casing. In the disk array apparatus according to the aspect of the invention, preferably the cooling means has a Peltier device and a fin-equipped heat pipe connected to one end of the Peltier device, and the additional cooling means has a heat sink.

In the disk array apparatus according to the aspect of the invention, preferably the disk array apparatus further has a motherboard which is arranged on the downside of the plural disk drives and is electrically connected to the disk drives through connectors, and means thermally connecting the disk drives to the motherboard. The means may have a spring such that one end thereof is connected to the connector or the motherboard and the other end is in contact with the disk drive. In the disk array apparatus according to the aspect of the invention, preferably the cooling means has a high-heat transportation member connected to the motherboard, and the additional cooling means has the heat sink. In the disk array apparatus according to the aspect of the invention, preferably the high-heat transportation member is a heat pipe.

According to the invention, the means which cools the whole of the disk drive array is provided one end side of the plural disk drives arranged in an array, and the means for enhancing cooling is arranged in the intermediate portion of the disk drive array. Therefore, the temperatures are equalized in the disk drives arranged in the casing. The noise is also reduced. As a result, the reliability can be improved to lengthen the life in the disk drive. The disk drives can be mounted at high density, and the large capacity and high speed of disk drive can be achieved in the disk array apparatus.

DESCRIPTION OF THE PREFERRED EMBODIMENTS

Figure 1:
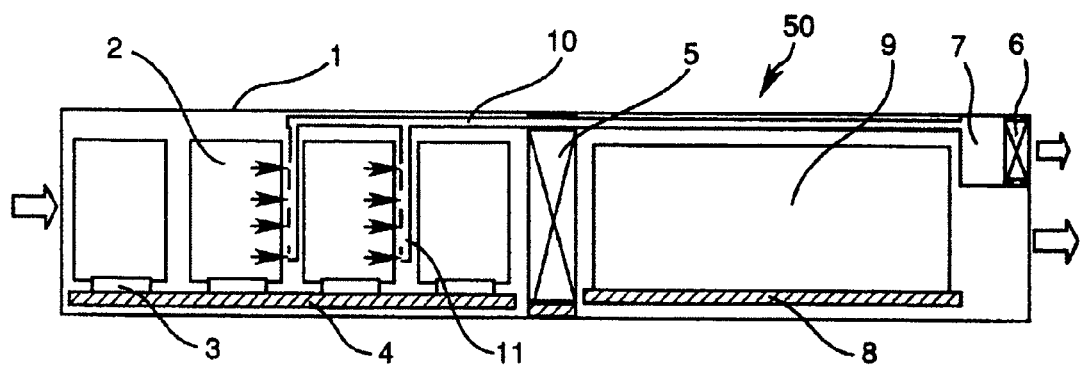
FIG. 1 is a sectional side view showing a disk array apparatus according to a first embodiment of the invention.
Figure 2:
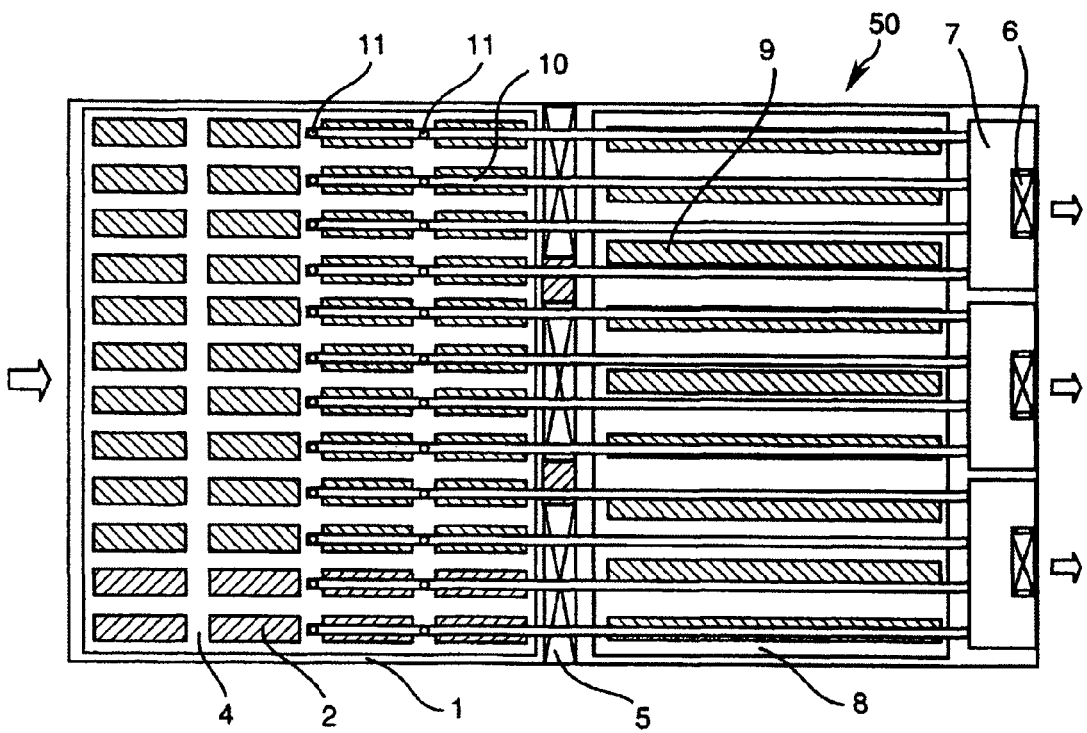
FIG. 2 is a top view showing the disk array apparatus of FIG. 1.
Figure 3:
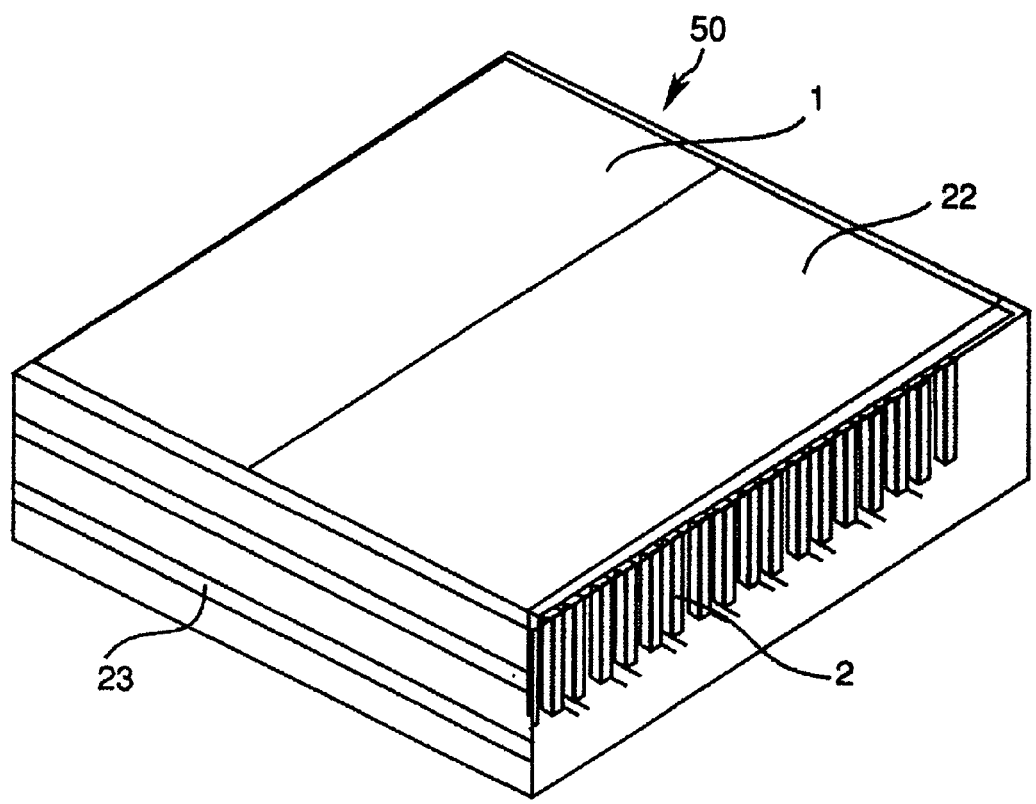
FIG. 3 is a perspective view showing the disk array apparatus of FIG. 1.
Figure 4:
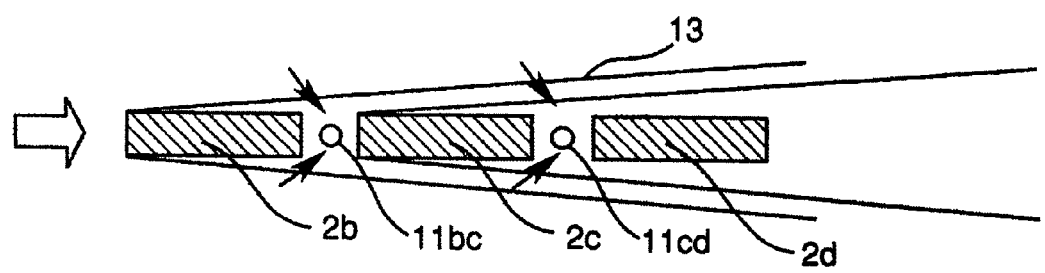
FIG. 4 is a view explaining a thermal boundary layer generated in the disk array apparatus.

Preferred embodiment of the invention will be described below with reference to the drawings. FIGS. 1 to 4 show a disk array apparatus 50 according to a first embodiment of the invention. FIG. 1 is a sectional side view of the disk array apparatus 50, FIG. 2 is a top view of the disk array apparatus 50, FIG. 3 is a perspective view of the disk array apparatus 50, and FIG. 4 is a perspective view showing an air flow in the disk array apparatus 50.

In the disk array apparatus 50, many disk drives 2 are mounted in a flattened casing 1. As shown in FIG. 3, the casing 1 has a cover 22 in an upper surface thereof and a guide rail attachment unit 23 in a side face thereof. In a front portion of the casing 1 of the first embodiment, the disk drives 2 are arranged in an array with four rows in a longitudinal direction and 12 rows in a width direction. Three main fans 5 are installed in the width direction at the back of the array of the disk drives 2, and each main fan 5 cools a part of the disk drives 2 corresponding to the four rows in the width direction. Nine electronic circuit boards 9 including power supplies and controllers are arranged in the width direction at the back of the main fans 5, and the electronic circuit board 9 is formed in a long and thin rectangular shape in the longitudinal direction.

A connector 3 is provided on the undersurface of each disk drive 2, and the connector 3 is connected to a connector on a first motherboard 4. The first motherboard 4 is provided under the disk drives 2, to cover the whole region of the disk drives 2. Similarly, a second motherboard 8 is provided beneath the electronic circuit boards 9 including power supplies and controllers, to cover the whole region of the electronic circuit boards 9. The first motherboard 4 and the second motherboard 8 are connected with wiring (not shown). The electronic circuit boards 9 are connected to the second motherboard 8 through connectors (not shown).

One of the features of the invention is that a means which suppresses temperature rise of the disk drives 2 is provided in addition to the main fans 5 in the disk drive apparatus 50. In the first embodiment of FIG. 1, three sub-fans 6 are attached to a wall surface of the casing 1 in the width direction. The sub-fans 6 are located at the back of the electronic circuit board 9, and in an upper portion of the wall surface. A chamber 7 which forms a closed space is provided to every sub-fan 6, and the sub-fan 6 exhausts air in the chamber 7 from an exhaust port provided in the casing 1.

Plural air ducts 10 are connected to each chamber 7. In the first embodiment, four air ducts 10 are connected to each chamber 7 according to the number of rows in the width direction of the disk drive 2. The air duct 10 runs through the upper portion of the casing 1 in the longitudinal direction, and a front end of the air duct 10 reaches an intermediate portion in the longitudinal direction of the disk drive array in which the plural disk drives 2 are arranged (in the first embodiment, the front end of the air duct 10 is located between the second and third rows). Inlet nozzles 11 are provided at positions corresponding to a gap between the disk drives 2 in the row which runs in the longitudinal direction, and the inlet nozzles 11 are located at the front end and the intermediate portion of the air duct 10 respectively.

Specifically, one of the nozzles 11 is arranged between the disk drive 2 in the second row and the one in the third row, and the other nozzle 11 is arranged between the disk drive 2 in the third row and the one in the fourth row. The nozzle 11 is a vertically-extended circular tube and has plural holes on a front side of the side face, the positions of the holes varying vertically.

A cooling operation in the first embodiment will be described below. In the disk array apparatus 50, as described above, the plural magnetic or optical type disk drives 2 are mounted in the casing 1. The disk array apparatus 50 is connected to a dedicated high-speed network line such as an optical network line, and is managed by management software. The disk array apparatus is used as SAN (Storage Area Network), NAS (Network Attached Storage), or the single RAID (Redundant Array of Inexpensive Disks) disk apparatus.

Although not described in detail, the disk drive 2 mounted in the disk array apparatus 50 has a disk body, an electronic component for control, and a connector. The disk body has a magnetic disk, a drive motor, a magnetic head, and an actuator. Among the above components, the drive motor, the actuator, and the electronic component for control such as LSI mainly are heat sources.

Primarily, the main fan 5 arranged in the intermediate portion of the disk array apparatus 50 introduces the outside air into the casing 1, to generate a cooling flow to discharge the heat generated in the heat source to the outside of the casing 1. When the main fan 5 has a low cooling capability, the temperature of the disk drives 2 rises, or variations in temperatures are generated among the plural disk drives 2, which possibly results in a malfunction of the disk drive 2 or the worsened reliability in long-term running.

For example, when the variation in temperature is generated among the disk drives 2, a timing shift is generated in the electronic circuit, which possibly generates a trouble in accessing to the disk drive 2 by a controller, or a delay in data transfer. When the temperature of the disk drive 2 rises above an allowable limit, a lubricant layer applied to a disk surface is degraded to cause easy damage of the disk.

On the other hand, the disk drive 2 has the magnetic disk, the drive motor, the actuator, and the like, and these movable components may become a noise source. When the number of disk drives 2 increases, the noises emitted from the components can not be neglected. The same holds true for the noise emitted from the main fans 5 which generate the air flow in the disk array apparatus 50.

Therefore, the disk drive apparatus 50 of the first embodiment causes the cooling air induced by the main fans 5 to be introduced from a front end of the casing 1 and to cool the disk drives 2 in the rows which run in the longitudinal direction. Then, it causes the air to cool the electronic circuit boards 9 and to be exhausted from a rear end of the casing 1. At this point, because the disk drive 2 and the electronic circuit board 9 are the heating body, the cooling air is heated when passing through the components, and the temperature of the cooling air rises as the cooling air flows to the rear portion side of the casing 1 which is of the down stream side.

That is, when only the cooling air induced by the main fan 5 is used, the temperature of the disk drives 2 on the downstream side of the cooling air becomes higher than that of the disk drives 2 on the upstream side. This is because the disk drive 2 on the downstream side enters a thermal boundary layer formed by the disk drive 2 on the upstream side, and a stagnation area having a very slow flow rate is formed between the rows of disk drives 2. In the stagnation area, hot air heated by the preceding disk drive 2 re-circulates.

Therefore, in the first embodiment, the sub-fan 6 is provided to eliminate the trouble. The sub-fan 6 is attached to the wall surface on the rear side in the upper portion of the casing 1. When the sub-fan 6 is operated, the air in the chamber 7 in which the sub-fan 6 is accommodated is exhausted to the outside of the casing 1 through an opening (not shown) formed in the casing 1.

The chamber 7 is communicated with the nozzles 11 through the air duct 10 extended in the longitudinal direction of the casing 1. The air duct 10 is extended to the disk drive array over the electronic circuit board 9. The nozzles 11 are attached to the intermediate portion and front end portion of the air duct 10. Accordingly, the hot air which stays and re-circulates in the stagnation area can be exhausted to the outside of the casing 1 through the air duct 10 and the chamber 7 from the nozzles 11 which are arranged between the disk drives 2 while vertically extended. Because the holes are made in the side surface of the nozzles 11 with the heights of the holes varying, the hot air staying in the stagnation area can be exhausted to the outside of the casing 1 from not only the upper portion of the casing 1 but also the lower portion of the casing 1.

Part of the air which is warmed up on passing through the disk drives 2 arranged on the front side of the nozzle 11 or on the upstream side of the nozzle 11 of the cooling air induced by the main fan 5 is sucked from the holes in the side face of the nozzle 11, because the nozzle 11 is attached to the intermediate portion of the disk drive 2 arranged in an array. Accordingly, the decrease in cooling capacity can be suppressed. The decrease in cooling capacity is caused by heat exchange between the heat generated by the disk drive 2 on the rear side or downstream side of the nozzle 11 and the air warmed by the disk drive 2 on the front side or the upstream side.

Because the nozzle 11 is provided to exhaust the air warmed by the disk drive 2 to the outside of the casing 1, preferably the holes are made on the front face side of the nozzle 11. Because the main fan 5 has the sufficient capacity of taking the outside air into the disk drive array, the outside air introduced into the casing 1 substantially flows in the horizontal direction, and the smaller change in temperature is generated in the vertical direction than in the horizontal direction. Accordingly, the hot air can efficiently be sucked at the positions in the height direction of the nozzle when the plural holes are made such that the positions of the holes are changed in the height direction.

The effect of the nozzle 11 in the first embodiment for a thermal boundary layer 13 will be described with reference to FIG. 3. As shown in FIG. 2, the four flattened disk drives 2 having the long shape in the longitudinal direction of the disk array apparatus 50 are arranged in line in the longitudinal direction. FIG. 3 shows the second to fourth disk drives 2. When the cooling air passes through a disk drive 2b located at the front position, the cooling air introduced from the outside into the casing 1 by the main fan 5 is warmed by the heat generated from the disk drive 2b, and the cooling air flows toward a disk drive 2c located behind the disk drive 2b while the temperature of cooling air rises. At this point, the thermal boundary layer 13 is developed in the side faces and rear face of the disk drive 2b located at the front position, and the thickness of the thermal boundary layer 13 becomes significant in the side faces of the disk drive 2c located behind the disk drive 2b.

Conventionally, the stagnation portion of the air flow is formed in the thermal boundary layer developed on the rear surface side of the disk drive 2b. However, in the first embodiment, because a nozzle 11 bc is arranged at the position corresponding to the stagnation portion, the flows of both the air in the thermal boundary layer developed near the rear portion of the disk drive 2b and the cool air around the thermal boundary layer are formed toward the nozzle 11bc. As a result, the circulation of the hot air formed between the disk drives 2b and 2c can be eliminated in the space between the disk drives 2b and 2c. Because the amount of cooling air whose temperature has risen and flowing into the disk drive 2c can be decreased, the temperature rise can be suppressed in the disk drive 2c. Similarly, because a nozzle 11cd is arranged in front of a disk drive 2d arranged on the downstream side of the disk drive 2c, the influence of the thermal boundary layer developed around the disk drive 2c can be decreased to suppress the temperature rise of the disk drive 2d.

When maintenance is performed on the disk array apparatus 50, the casing 1 is drawn from the rack by use of a guide rail provided in a later-mentioned system cabinet 60. Then, the cover 22 is opened to take out the air duct 10 integral with the chamber 7. This facilitates the drawing and insertion of the disk drives 2, the first motherboard 4, the second motherboard 8, the electronic circuit board 9 such as the power supply and the controller, and the main fan 5.

In the first embodiment, the sub-fan 6 is arranged on the downstream side because the air is taken from the nozzles 11 (11bc and 11cd). As a result, the air flow is easily uniformed compared with the case in which the air is discharged from the nozzles 11. Therefore, the air flowing through each nozzle 11 can be equalized. Only the small amount of air flow can suck the re-circulating hot air which is possibly formed between the disk drives 2b and 2c or between the disk drives 2c and 2d, so that a capacity of the sub-fan 6 can be set smaller than that of the main fan 5. Therefore, the noise generation from the sub-fan 6 can be avoided.

In the first embodiment, the disk drives 2 are cooled by both the cooling effect obtained by the cooling air induced by the main fans 5 and the cooling effect obtained by the suppression of the development of the thermal boundary layer by the suction from the nozzles 11. Accordingly, the disk drives 2 can efficiently be cooled to equalize the temperature distribution among the disk drives 2. In the first embodiment, it is not necessary to increase the capacity and load on the main fans 5, and the noise can also be suppressed.

Figure 5:
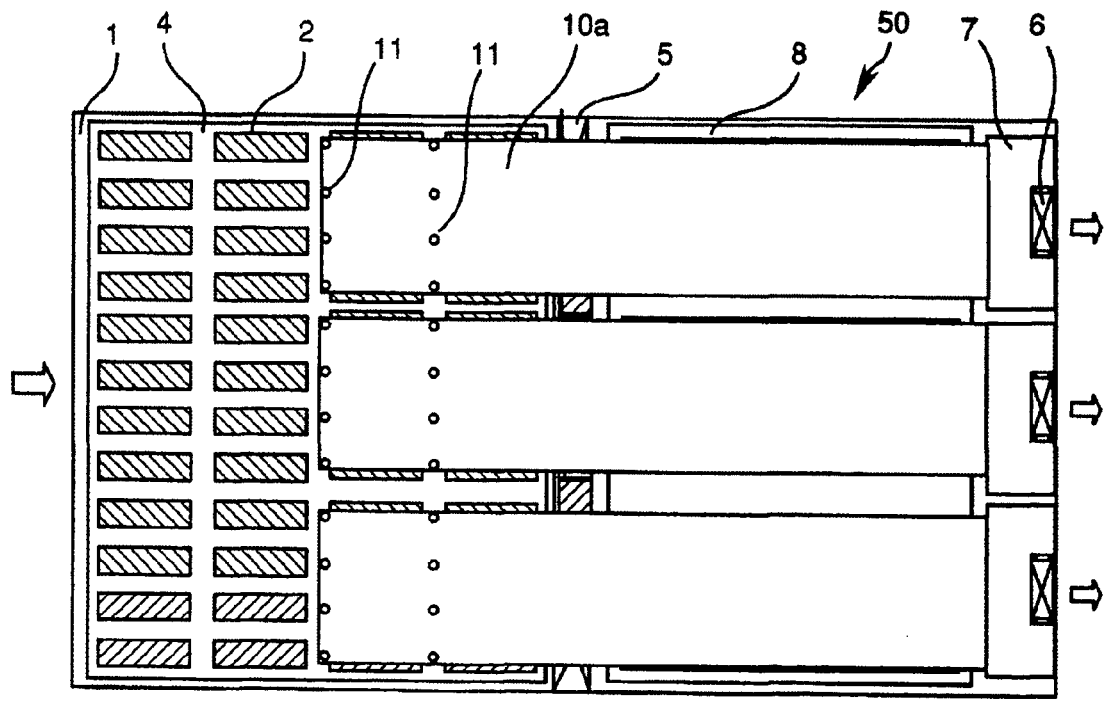
FIG. 5 is a top view showing a first modification of the disk array apparatus of the first embodiment.

FIG. 5 is a top view showing a first modification of the disk array apparatus of the first embodiment. In the first embodiment of FIG. 2, the plural air ducts 10 are connected to each chamber 7 which accommodates the sub-fan 6. On the other hand, in the first modification, an air duct 10a is connected to each chamber 7, and the air duct 10a has the substantially same dimension as that of the chamber 7 in the width direction. Although the width of the air duct 10a is wider than that of the air duct 10 of FIG. 2, the layout and the number of nozzles 11 attached to the air duct 10a are similar to those of the air ducts 10 of FIG. 2. According to the first modification, when the maintenance is performed on the disk array apparatus 50, the attachment and detachment can be facilitated because the chamber 7 is integral with the air duct 10a.

Figure 6:
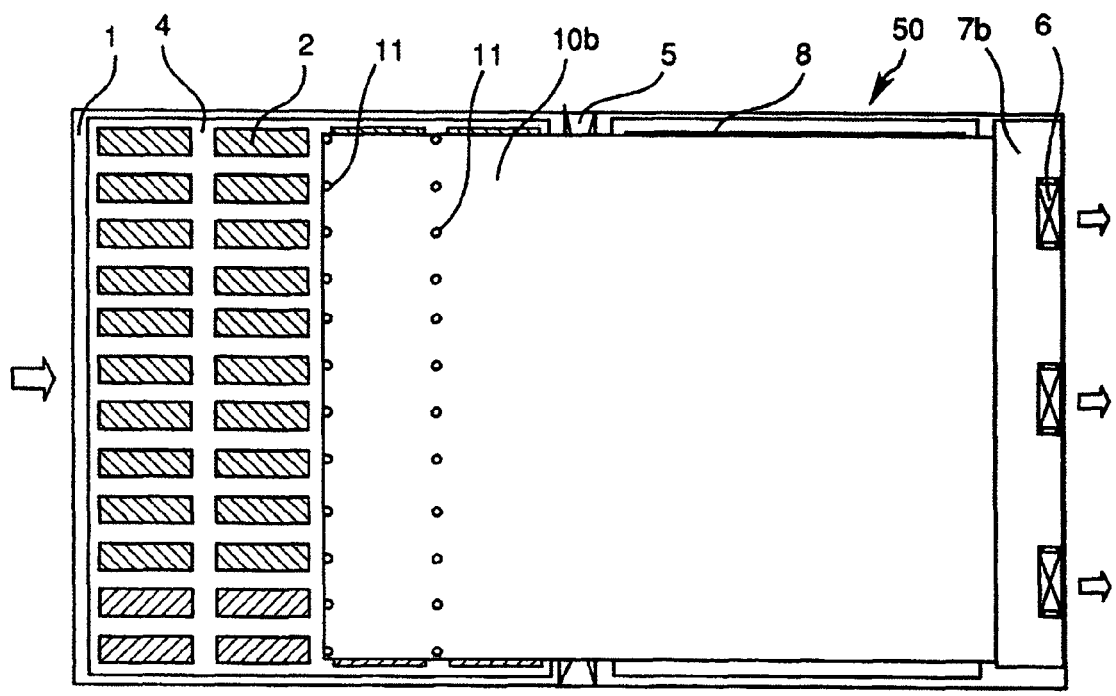
FIG. 6 is a top view showing a second modification of the disk array apparatus of the first embodiment.

FIG. 6 is a top view showing a second modification of the disk array apparatus of the first embodiment. In the first embodiment of FIG. 2, the chamber 7 is provided for each sub-fan 6. The second modification differs from the first embodiment in that a chamber 7b which accommodates all the sub-fans 6 possessed by the disk array apparatus 50 is formed and connected to an air duct 10b having the substantially same dimension as the chamber 7b in the width direction. In the second modification, the layout and the number of nozzles 11 attached to the air duct 10b are similar to those of the air ducts 10 of FIG. 2. According to the second modification, because the air duct 10b and the chamber 7b are unified, the maintenance is performed more easily.

In the first embodiment and the modifications thereof, the nozzles 11 are provided between the disk drive 2b in the second row and the disk drive 2c in the third row and between the disk drive 2c in the third row and the disk drive 2d in the fourth row. However, the invention is not limited to the first embodiment and the modifications thereof. For example, nozzles 11 may be provided in all the gaps between the disk drives. In this case, the stagnation of hot air can further be suppressed.

Figure 7:
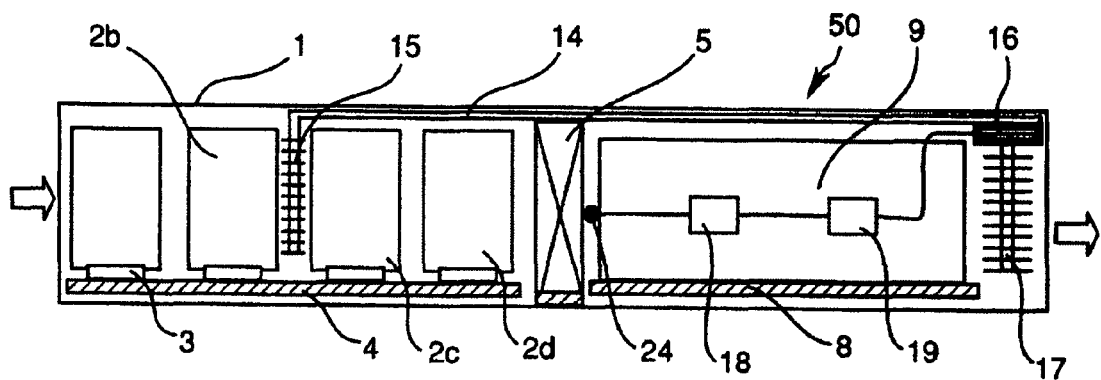
FIG. 7 is a sectional side view showing a disk array apparatus according to a second embodiment of the invention.

FIG. 7 is a sectional side view showing a disk array apparatus according to a second embodiment of the invention. The second embodiment differs from the first embodiment and the modifications thereof in that the cooling means cools the hot air flowing into the gap between the disk drives 2 instead of the suction of the hot air between the disk drives 2. Specifically, a heat pipe 14 which has a heat transfer tube in the front end portion thereof is arranged at the back of the disk drive 2 in the second row. The heat transfer tube is piercing through many laminated fins 15. As with the air duct 10 of FIG. 2, the heat pipe 14 is extended toward the rear side in the upper portion of the casing 1, and one end of the heat pipe 14 is brought into contact with a cooling surface of a Peltier device 16 arranged in the rear portion of the casing 1. A heat sink 17 is arranged near the exhaust port formed on the backside of the casing. The heat sink 17 is brought into contact with a radiating surface of the Peltier device 16.

A temperature sensor 24 is provided at the back of the disk drive 2d in the fourth row and at the back of the main fan 5. The temperature sensor 24 is connected to CPU 18 mounted on a power supply board in the electronic circuit board 9. CPU 18 is connected to a driver 19 mounted on the electronic circuit board 9 to which the temperature sensor 24 is connected. Electric power is supplied to the Peltier device 16 from the driver 19.

In the disk array apparatus 50 of the second embodiment, when an operating load on each disk drive 2 is increased, output of the temperature sensor 24 becomes large. When the output of the temperature sensor 24 exceeds a predetermined upper limit, CPU 18 provides a command to the driver 19 to supply the electric power to the Peltier device 16. When the electric power is supplied to the Peltier device 16, the temperature of the cooling surface of the Peltier device 16 becomes below ambient temperature, and the temperature of the radiating surface of the Peltier device 16 becomes above ambient temperature.

The air between the disk drive 2b in the second row and the disk drive 2c in the third row is cooled by the heat exchange with the fins 15 at the front end portion of the heat pipe 14, which efficiently cools the disk drives 2c and 2d in the third and fourth rows on the downstream side, respectively. Accordingly, the disk drives 2 can be cooled well without increasing the capacity and load on the main fans 5. Additionally, the whole noise can be suppressed because the capacity and load on the main fans 5 are not increased.

The heat absorbed from the air between the disk drive 2b in the second row and the disk drive 2c in the third row is dissipated from the heat sink 17 provided on the radiating surface side. The heat sink 17 is provided at the end of the casing 1 and in the most downstream portion of the flow induced by the main fans 5, so that the heat sink 17 has no adverse influence on the cooling of other heating bodies such as electronic circuit board 9. When the output of the temperature sensor 24 is lower than a predetermined lower limit, CPU 18 provides a command to the driver 19 to stop the electric power supply to the Peltier device 16. Therefore, the unnecessary cooling can be prevented to save the electric power.

Figure 8:
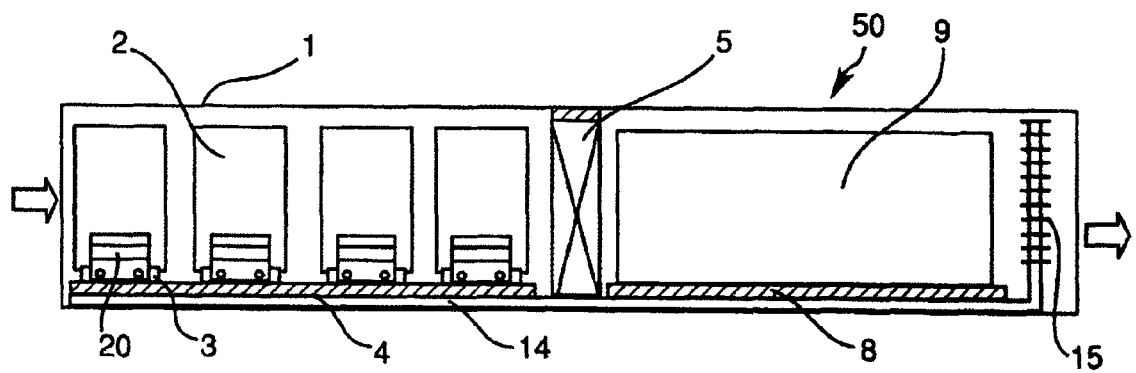
FIG. 8 is a sectional side view showing a disk array apparatus according to a third embodiment of the invention.

FIG. 8 is a sectional side view showing a disk array apparatus 50 according to a third embodiment of the invention. In the third embodiment, thermal connectors 20 are provided in the lower portions of the disk drives 2 while the disk drives 2 are connected to the first motherboard 4 through the connectors 3 respectively. The heat pipe 14 is arranged under the disk drives 2. The heat pipe 14 is extended to a neighborhood of the rear surface of the casing 1, and a heat radiating portion with the fin 15 is formed in the rear end portion of the heat pipe 14.

Figure 9:
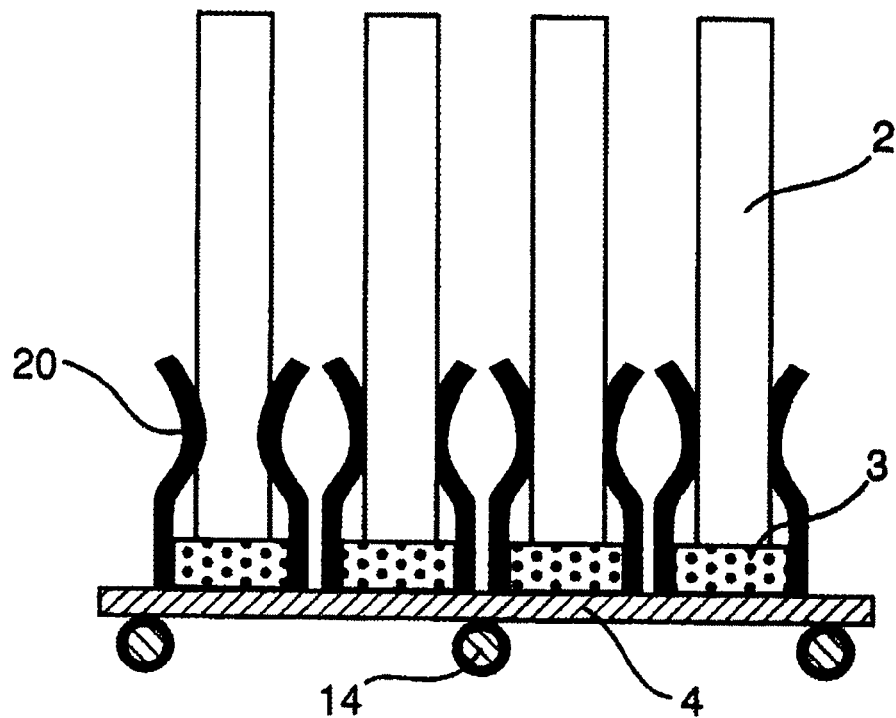
FIG. 9 is a sectional front view showing the disk array apparatus of FIG. 8.
Figure 10:
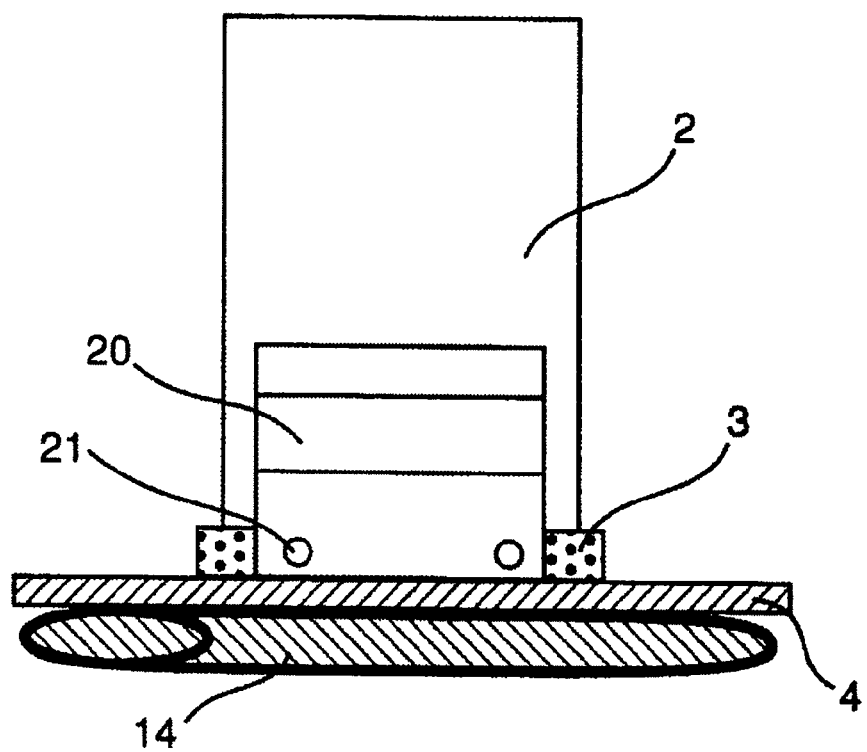
FIG. 10 is a sectional side view showing the disk array apparatus of FIG. 8.

FIG. 9 is a sectional front view showing the detailed disk drive 2, and FIG. 10 is a sectional side view showing the detailed disk drive 2. The heat pipe 14 is connected to the lower surface side of the first motherboard 4. The connector 3 is attached to the upper surface side of the first motherboard 4, and the thermal connector 20 is attached to the connector 3 with a screw 21. The thermal connector 20 is formed in a plate whose width is slightly shorter than a length of the disk drive 2 in the longitudinal direction, and the thermal connector 20 has a shape such that the thermal connector 20 is bent at plural points in the vertical direction. Because the thermal connector 20 has a bent shape, the thermal connector 20 has a spring property.

When the thermal connector 20 and the heat pipe 14 are used, a considerable degree of the heat generated by each disk drive 2 is transferred to the evaporation portion of the heat pipe 14 through the thermal connector 20 and the first motherboard 4. The evaporation portion of the heat pipe 14 is a contact portion with the first motherboard 4. Finally, the heat exchange is generated between the fins 15 provided in the heat radiating portion of the heat pipe 14 and the cooling air induced by the main fan 5, and the heat is dissipated to the outside of the casing 1. Because the fins 15 are arranged at the end of the casing 1, the fins 15 have no adverse influence on the cooling of other heating bodies. Because the thermal connector 20 has the spring property, the disk drive 2 is sandwiched between the right and left thermal connectors 20, which allows the contact to be secured between the thermal connectors 20 and the disk drive 2.

In the third embodiment, the disk drives 2 are cooled by both the cooling air induced by the main fan 5 and the heat conduction onto the side of the motherboard 4, so that the cooling efficiency is extremely enhanced. Because the disk drives 2 are placed on the common motherboard 4, the temperature distribution is equalized among the disk drives 2. In the third embodiment, the disk drives 2 can be cooled well without increasing the capacity and load on the main fan 5. Further, whole noise can be suppressed.

Figure 11:
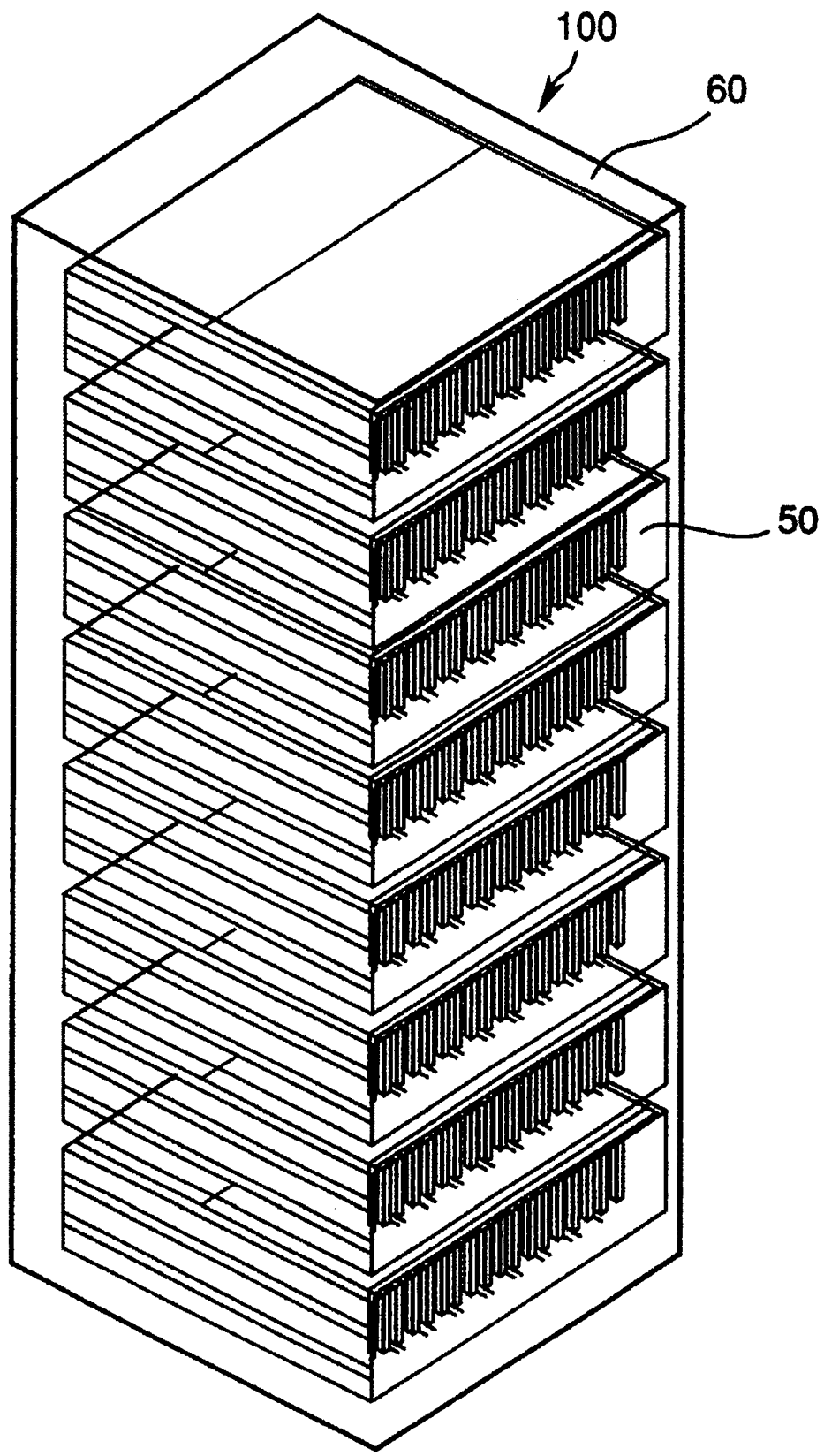
FIG. 11 is a perspective view showing a disk array system where the disk array apparatuses according to the invention are mounted.

FIG. 11 is a perspective view showing a disk array system 100 where the disk array apparatuses 50 according to the invention are stacked in layers. Disk array apparatuses 50 are mounted in a cabinet 60 of a universal system rack. A mesh plate or a punching plate (not shown) is attached onto a front face side and a rear face side of the universal rack. Conventionally, because the mesh plate or the punching plate has a function as flow resistance against the cooling air, sometimes the hot air cannot sufficiently be exhausted to the outside of the cabinet 60 only by the main fan. In such cases, the cooling efficiency is lowered compared with the single use of the disk array apparatus 50. On the contrary, in the third embodiment, the temperature of the cooling air between the disk drives 2 can be lowered, and the disk drive array can be stably cooled even if plural disk array apparatuses 50 are mounted in the universal rack 60.

According to the disk array apparatus of the invention, the cooling capacity is enhanced, and the temperature difference between the disk drives can be decreased in the disk array apparatus. As a result, the reliability can be improved in the disk drive to lengthen the life. Additionally, the disk drives can be mounted at high density to enable the large capacity and speed enhancement in the disk array apparatus. The noise can also be reduced in the disk array apparatus.

What is claimed is:

1. A disk array apparatus comprising:
    a disk drive array in which a plurality of disk drives are arranged in an array;
    a casing which accommodates the disk drive array;
    a fan which is arranged on one end side of the disk drive array;
    a cooling means which is arranged in an intermediate portion of the disk drive array,
    wherein the cooling means is arranged to cool a part of the disk drives which is positioned on a downstream side of the cooling means with respect to cooling air generated by the fan.

2. The disk array apparatus according to claim 1, wherein the cooling means is a suction tube arranged in the intermediate portion of the disk drive array, an air duct being connected to the suction tube, the cooling air which has already cooled the disk drive array flowing through the air duct, and an exhaust means is provided, the exhaust means for exhausting the cooling air flowing through the air duct to the outside of the casing.

3. The disk array apparatus according to claim 2, wherein the exhaust means has an intake fan and a chamber which accommodates the intake fan, the other end of the air duct being connected to the chamber, and the chamber is provided in the casing.

4. The disk array apparatus according to claim 3, wherein, in the casing, the disk drive arrays are arranged in one row in a vertical direction and in a plurality of rows in a horizontal direction, and the fan is arranged every row or every plural rows of the disk drive arrays.

5. The disk array apparatus according to claim 1, wherein an additional cooling means is provided in the cooling means through a heat transfer tube, and is arranged near an opening formed in the casing, the additional cooling means locally cooling hot air caused by heat generation of the disk drive array, and the additional cooling means exhausting the air to the outside of the casing.

6. The disk array apparatus according to claim 5, wherein the cooling means has a Peltier device and a fin-equipped heat pipe connected to one end of the Peltier device, and the additional cooling means has a heat sink.

7. The disk array apparatus according to claim 5, further comprising a motherboard electrically connected to the disk drives through connectors and is arranged on the downside of the plurality of disk drives, and the means thermally connecting the disk drives to the motherboard.

8. The disk array apparatus according to claim 7, further comprising a spring such that one end thereof is connected to the connector or the motherboard while the other end is in contact with the disk drive.

9. The disk array apparatus according to claim 5, wherein the cooling means has a high-heat transportation member connected to the motherboard, and the additional cooling means has the heat sink.

10. The disk array apparatus according to claim 9, wherein the high-heat transportation member is a heat pipe.

* * * * *